(12) United States Patent
Almutairi

(10) Patent No.: US 10,052,899 B2
(45) Date of Patent: Aug. 21, 2018

(54) ELECTRONIC SEAL DEVICE

(71) Applicant: Jarrah Almutairi, Safat (KW)

(72) Inventor: Jarrah Almutairi, Safat (KW)

( * ) Notice: Subject to any disclaimer, the term of this patent is extended or adjusted under 35 U.S.C. 154(b) by 0 days.

(21) Appl. No.: 15/169,701

(22) Filed: May 31, 2016

(65) Prior Publication Data

US 2017/0341446 A1    Nov. 30, 2017

(51) Int. Cl.
| | |
|---|---|
| *B41K 1/00* | (2006.01) |
| *G06F 13/42* | (2006.01) |
| *H04N 5/225* | (2006.01) |
| *H04N 5/77* | (2006.01) |
| *G06K 9/00* | (2006.01) |
| *H04N 7/10* | (2006.01) |
| *G08B 5/36* | (2006.01) |

(52) U.S. Cl.
CPC .......... *B41K 1/003* (2013.01); *G06F 13/4282* (2013.01); *G06K 9/00013* (2013.01); *G06K 9/00456* (2013.01); *G08B 5/36* (2013.01); *H04N 5/2252* (2013.01); *H04N 5/2257* (2013.01); *H04N 5/772* (2013.01); *H04N 7/10* (2013.01)

(58) Field of Classification Search
CPC .. B41K 1/003; G06F 13/4282; H04N 5/2257; H04N 5/2252; H04N 7/10; H04N 5/772; G06K 9/00456; G06K 9/00013; G08B 5/36

See application file for complete search history.

(56) References Cited

U.S. PATENT DOCUMENTS

| | | | |
|---|---|---|---|
| 6,991,332 B1* | 1/2006 | Fan | B41J 3/36 347/108 |
| 7,296,515 B1* | 11/2007 | Chung | B41K 1/02 101/109 |
| 8,256,688 B2 | 9/2012 | Bourrieres et al. | |
| 8,572,695 B2 | 10/2013 | Bailloeul et al. | |
| 9,641,752 B2* | 5/2017 | Mattes | H04N 5/23222 |
| 2004/0255081 A1* | 12/2004 | Arnouse | G06F 19/323 711/115 |
| 2005/0201809 A1* | 9/2005 | Silverbrook | B41J 3/36 400/693 |
| 2011/0061092 A1* | 3/2011 | Bailloeul | G06F 3/002 726/4 |
| 2012/0293642 A1* | 11/2012 | Berini | G06F 21/32 348/77 |
| 2014/0120981 A1* | 5/2014 | King | G06F 17/30265 455/556.1 |
| 2015/0026478 A1* | 1/2015 | Raduchel | H04L 9/3247 713/178 |
| 2016/0078247 A1* | 3/2016 | Tucker | G06F 21/6218 726/1 |

FOREIGN PATENT DOCUMENTS

CN           204037104 U       12/2014

* cited by examiner

*Primary Examiner* — Mekonnen Dagnew
(74) *Attorney, Agent, or Firm* — Richard C. Litman

(57) ABSTRACT

The electronic seal device is a document stamp which includes a fingerprint reader (for authenticating the user) and a camera for recording the document being sealed/stamped. The device includes memory and communication ports. An electronic tablet may be used in the computer programming process wherein the seal device may be connected to the computer to determine the functions of the document stamp and the number of times that the stamp has been used to seal documents.

1 Claim, 4 Drawing Sheets

ELECTRONIC SEAL DEVICE

BACKGROUND OF THE INVENTION

1. Field of the Invention

The present invention relates to document sealing and recordation, and particularly to an electronic seal device that includes a document stamp, a fingerprint reader (for authenticating the user) and a camera for recording the document being sealed/stamped.

2. Description of the Related Art

It is often necessary to provide a stamped seal for authentication of many official documents. Generally, only certain individuals are authorized to provide the required seal for such documents. As such, many precautions are taken daily by authorized individuals to prevent unauthorized users from accessing such stamping devices. Undertaking precautionary measures to safeguard these devices on a daily basis can become arduous.

Thus, an electronic seal device solving the aforementioned problems is desired.

SUMMARY OF THE INVENTION

The electronic seal device includes a seal or stamp for documents, of the type typically used by a government official, clerk, notary or the like. The device further includes a fingerprint reader (for authenticating the user) and a camera for recording the document being sealed/stamped. The device includes memory and communication ports, as well as electronic circuitry for providing the various functions. The electronic seal device may be connected to a computer.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
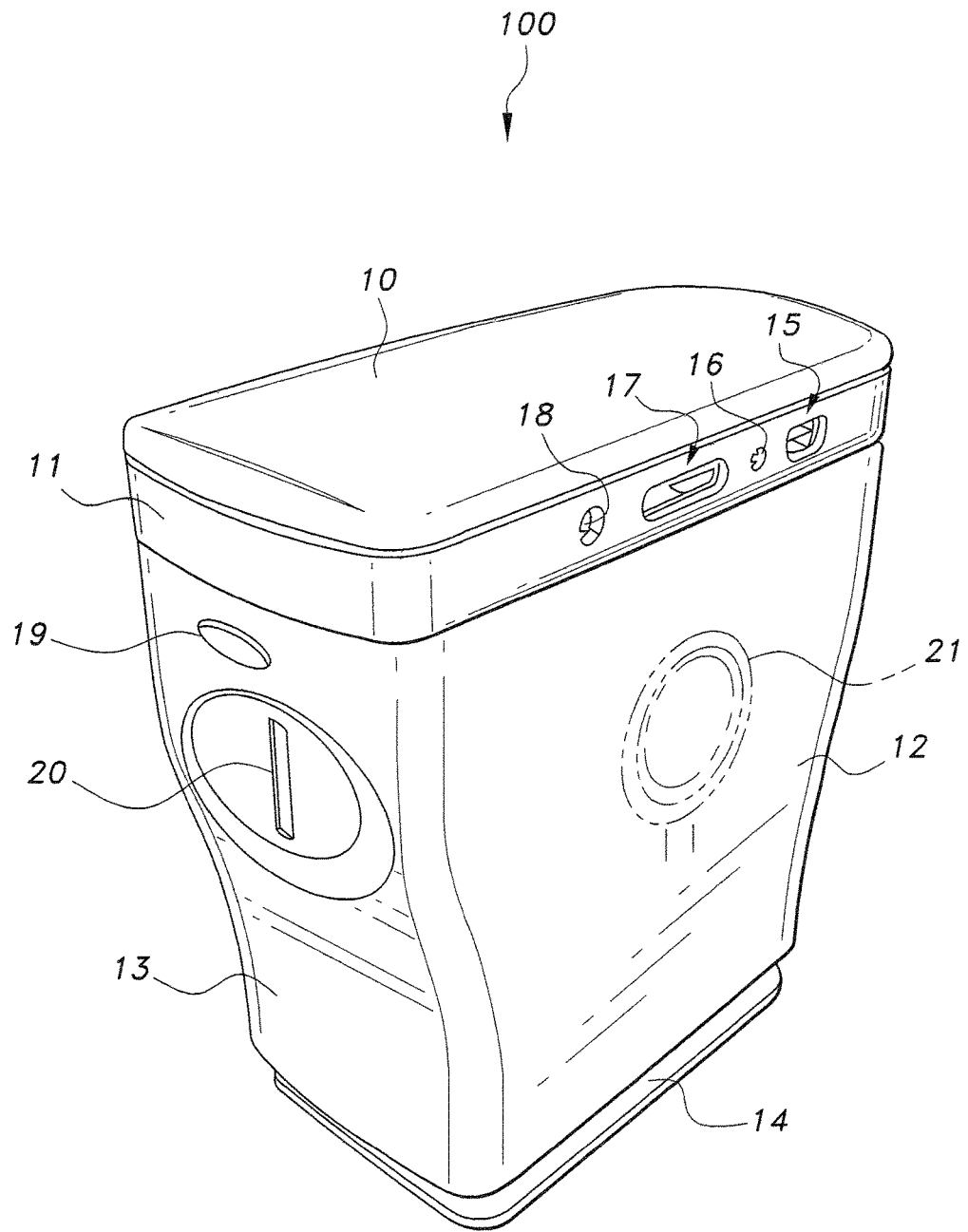
FIG. 1 is a perspective view side of the electronic seal device according to the present invention.

The electronic seal device 100 can provide a seal or stamp for documents, of the type typically used by a government official, clerk, notary or the like. The device 100 includes a generally rectangular housing 13 including a seal stamp 14, a fingerprint sensor or reader 20 (for authenticating the user), and a camera 22 for photographing and recording the document being sealed/stamped. The device 100 includes memory and communication ports, as well as electronic circuitry for providing the various functions. The electronic seal device 100 may be connected to a computer.

Figure 2:
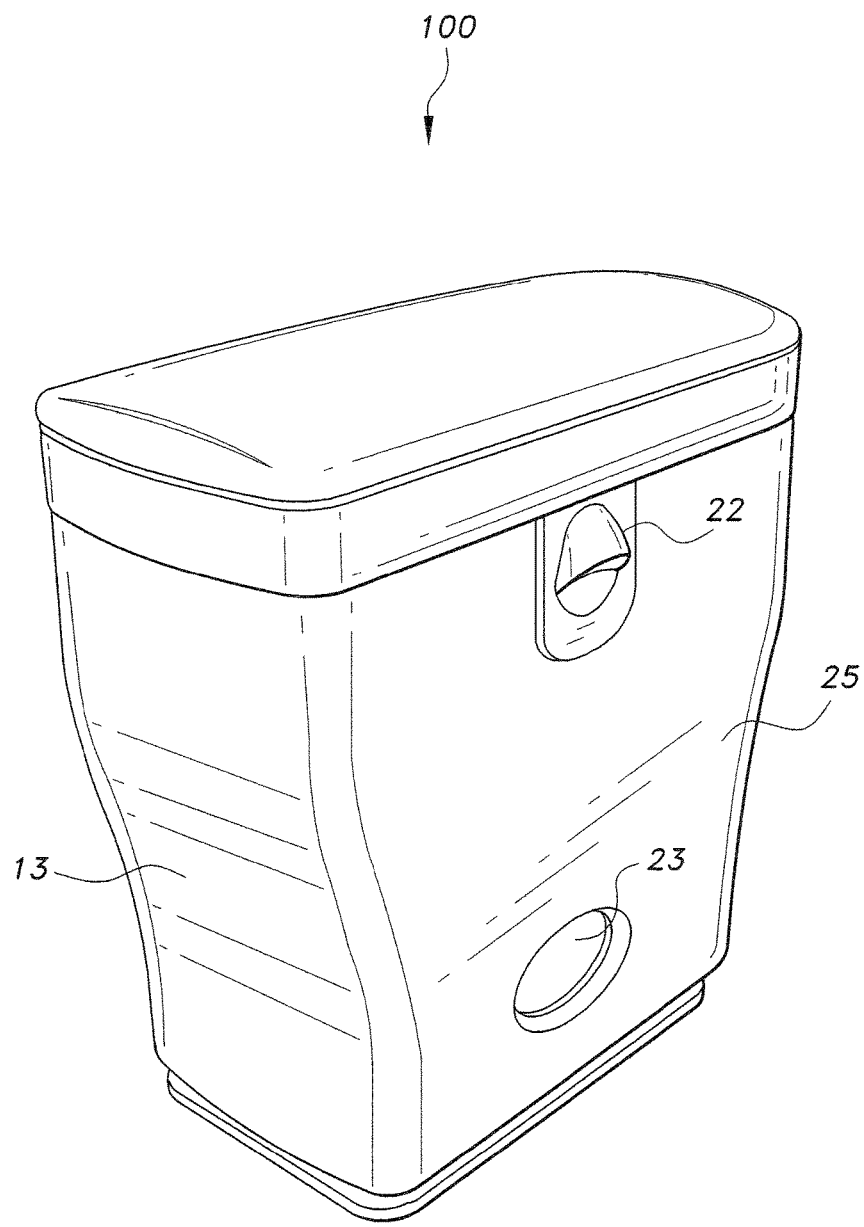
FIG. 2 is a perspective view showing the adjustable camera and ink release of the electronic seal device according to the present invention.

As shown in FIG. 1, the housing 13 of the electronic seal device 100 can be thicker or wider at a top portion than at a bottom portion to facilitate holding the electronic seal device 100 in an ergonomic fashion. A top housing cover 10 and a substantially rectangular shaped body retention ring 11 can be provided at a top end of the housing 100. The housing 13, e.g., the cover 10 and/or the ring 11, can include a USB port 15, a reset button 16, an SD card port 17, and one or more LED lights 18 which can be activated to emit light. The USB port 15 may be used to transmit document images and user fingerprint information to a connected device via connected computer memory. An SD card, fitted into the SD card port 17, can be in operable communication with the computer memory. The SD card may include programmed instructions for operation of the electronic seal device 100. The LED light 18 may indicate operational status of the electronic seal device 100. A logo 21, e.g., resembling the seal, can be provided on an outer surface of the housing 13. A portion of the camera 22 can extend out of the housing 13 and face downward, as shown, to facilitate photographing a document being stamped. The camera 22 can be adjustable. An opening 23 for ink cartridge release can be defined within the housing 13, as shown in FIG. 2.

The housing 13 can include a start button 19 that is in operable communication with the computer memory and the fingerprint sensor 20 to initiate operation of the electronic seal device 100. The fingerprint sensor 20 is operable with the computer memory to store a plurality of authenticated user fingerprints, e.g., about 100, and classify document images associated with each user's fingerprint. For example, an index number can be digitally printed on the bottom of each stored document image. The SD card fitted into the SD card port 17 may provide this indexing functionality via programmed instructions stored on the SD card. The seal device 100 may be connected to a computer to monitor the functions of the document stamp and/or the number of times that the stamp has been used to stamp a seal on documents.

Figure 3:
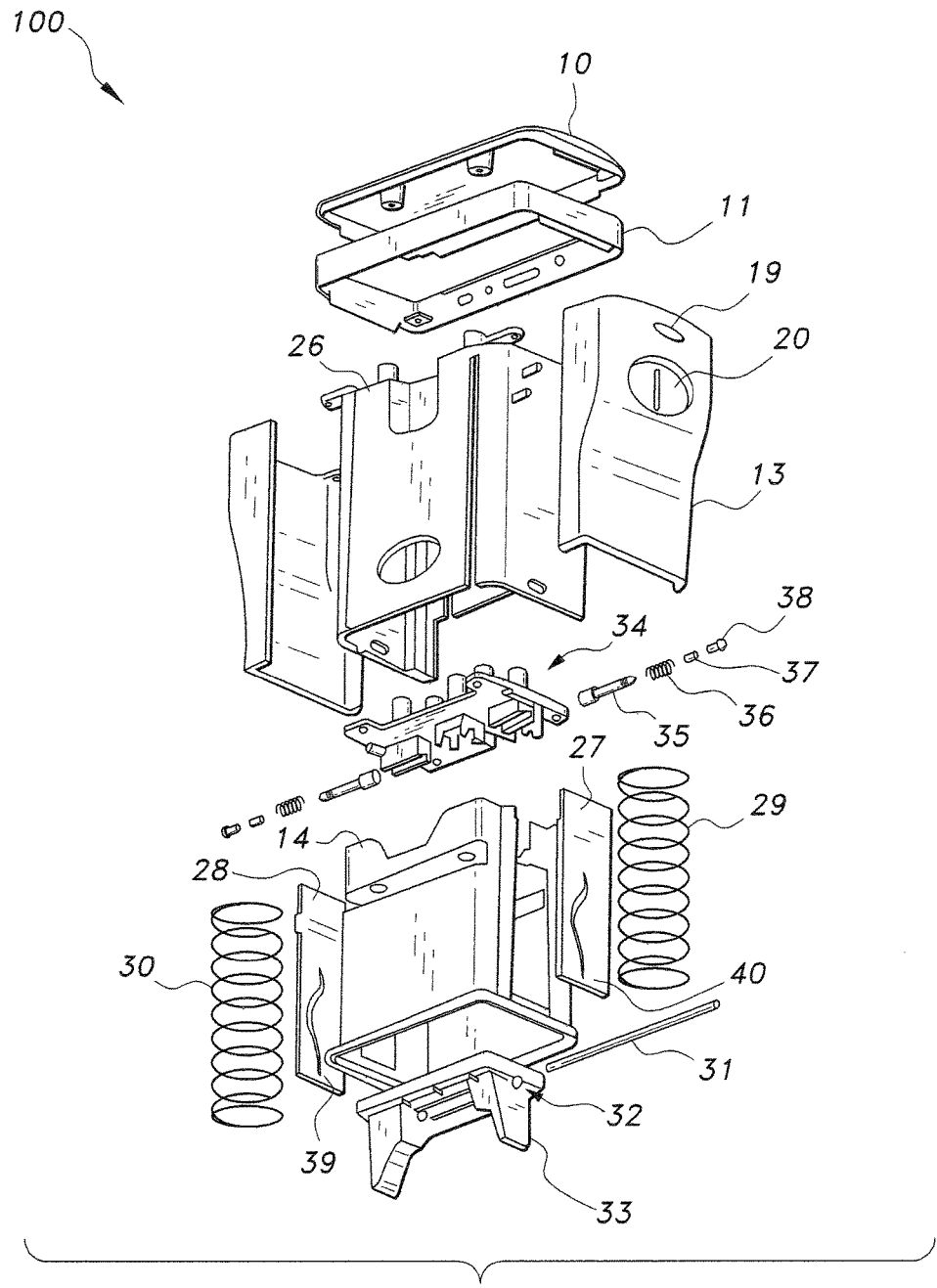
FIG. 3 is an exploded, perspective view of the electronic seal device according to the present invention.

As shown in FIG. 3, stamp 14 includes stamp head 33 attached to bottom of stamp 14. The stamp 14 can be connected, e.g., slidably connected, to an ink base 34. For example, an assembly including a screw receptacle 35, a screw spring 36, a nut 37, and a screw 38 threaded into the screw receptacle 35 can be used to slidably connect the ink base 34 to the stamp 14. The screw spring 36 can be fitted over shaft of the screw receptacle 35. The screw 38 can be threaded into the screw receptacle 35. The screw 38 can engage first and second tracks 39 and 40 of left and right side guides 27 and 28 of stamp 14. An inner housing 26 retains electronic components of the device 100. Stamp 14 can be slidably connected to housing 13. Primary springs 29 and 30 can be disposed between the inner housing 26 and the outer housing 13. The springs 29 and 30 can be supported by a pin 31 that fits through apertures 32 in the stamp head 33.

Figure 4:
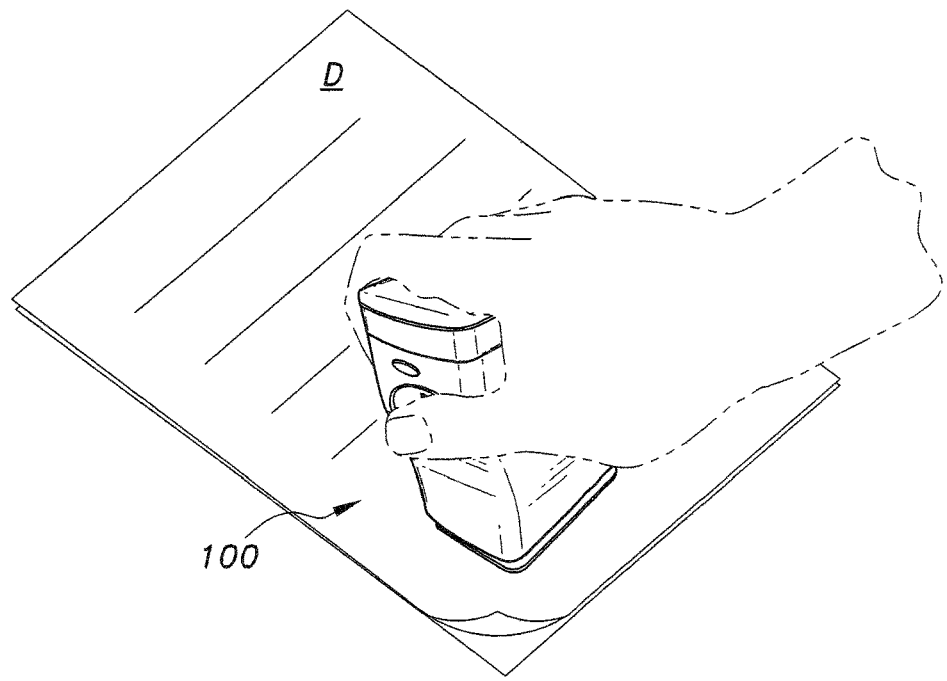
FIG. 4 is a perspective view showing the electronic seal device in use according to the present invention.
Figure 5:
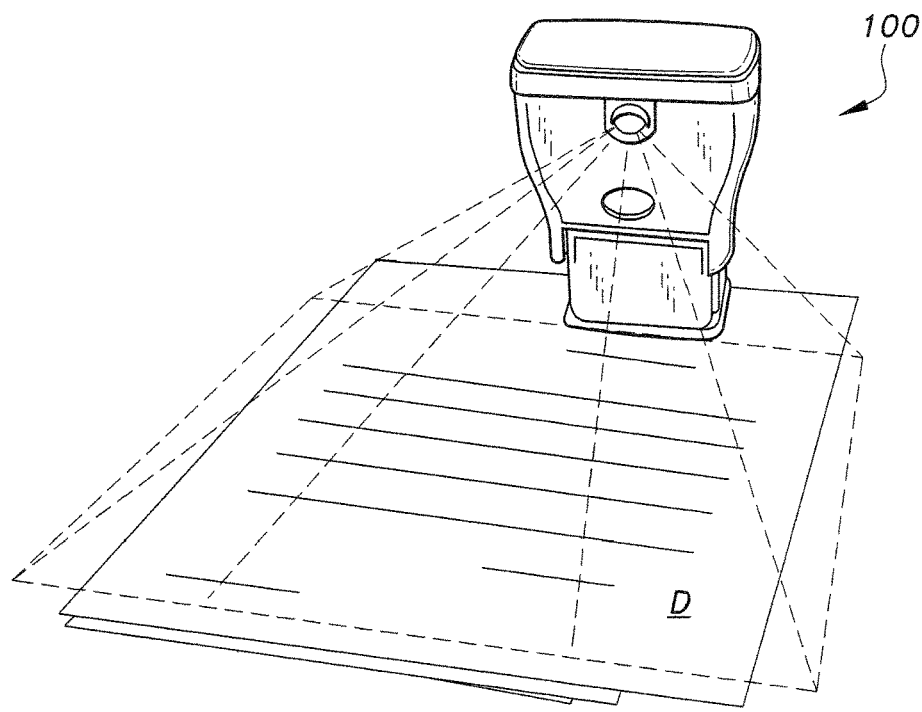
FIG. 5 is a perspective view showing camera operation of the electronic seal device according to the present invention.

A user can be authorized to use the device upon recognition of the user's fingerprint by the device. Primary springs 29 and 30 can be compressed to thereby move the ink base 34 toward stamp head and press the stamp head against the document to be stamped. The camera is then automatically activated to photograph the document D. FIG. 4 shows the electronic seal device 100 being used to authenticate a document D. FIG. 5 shows the electronic seal device 100 in its resting position while capturing an image of the document D.

It is to be understood that the present invention is not limited to the embodiments described above, but encompasses any and all embodiments within the scope of the following claims.

I claim:

1. A handheld electronic seal device for authenticating and digitally capturing documents, the handheld electronic seal device consisting of:
   a document stamp for placing a stamp on a document, the stamp being indicia indicative of an official designation by a user, wherein the document stamp includes a stamp head containing the indicia and an ink base;
   a camera having a field of view for automatically capturing an image of the document being stamped with the document stamp;
   a fingerprint sensor for capturing and comparing a fingerprint of the user;
   computer memory including:
      means for storing user fingerprints;
      means for classifying the document images saved indexed by a stored fingerprint of each user; and
      means for digitally printing an index number on the bottom of each stored document image;
   a housing, the housing including an inner housing and an outer housing, the inner housing being slidably fitted within the outer housing and dimensioned and configured for supporting the document stamp, the camera, the fingerprint sensor, and the computer memory;
   a pair of opposed compression springs located between the inner and outer housings, wherein the document stamp is slidably movable in the inner housing to be moved into contact with the document being authenticated;
   a USB port disposed in the outer housing, the USB port being in operable communication with the fingerprint sensor and the camera to transmit document images and user fingerprint information to a connected device via the computer memory;
   an external memory card port disposed in the document housing, the external memory card port being in operable communication with the computer memory;
   an LED light disposed in the outer housing, the LED light indicating operational status of the document stamp;
   a start button disposed in the outer housing, the start button being in operable communication with the computer memory to initiate operation of the document stamp;
   a reset button;
   a removable cover disposed on the outer housing; and
   a logo disposed on the face of the housing for identifying the document stamp within the housing.

* * * * *